Patented Oct. 11, 1932

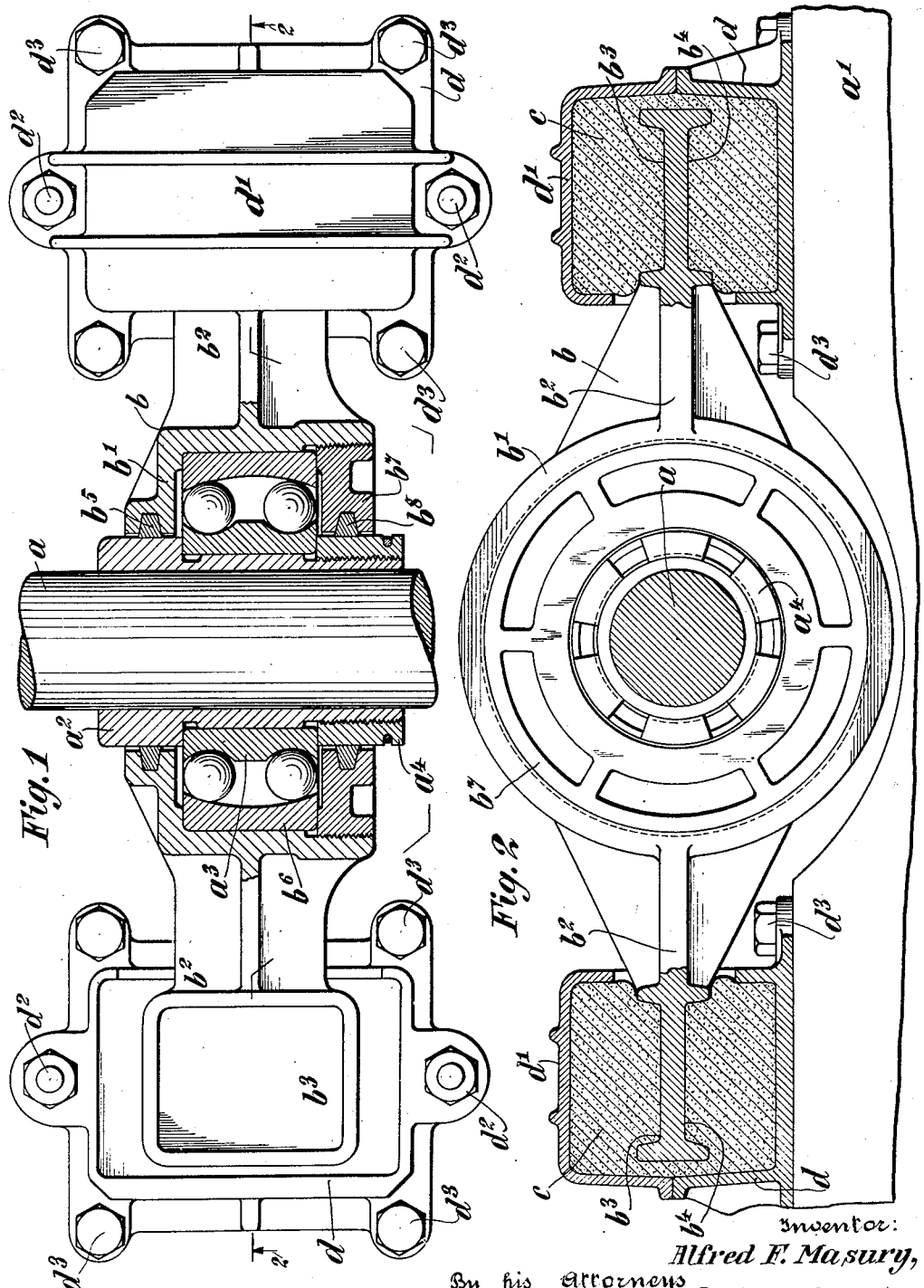

1,881,800

UNITED STATES PATENT OFFICE

ALFRED F. MASURY, OF NEW YORK, N. Y., ASSIGNOR TO THE RUBBER SHOCK INSULATOR CORPORATION, OF WILMINGTON, DELAWARE, A CORPORATION OF DELAWARE

PROPELLER SHAFT BEARING

Original application filed July 15, 1926, Serial No. 122,528. Divided and this application filed January 6, 1928. Serial No. 244,788.

The present invention relates to the mounting of power units and associated parts for marine use. The hull and superstructure of boats form an effective, sound, and vibration transmitting means through which irregularities in driving, as well as noises, are transmitted to the passenger accommodations. The elimination of these objectionable features has long been an important objective in boat designing.

In the application of Alfred F. Masury, Serial No. 122,528 filed July 15, 1926, now Patent No. 1,755,549 issued April 22, 1930, for cushioning devices for marine propulsion, of which this case is a division, there is shown and described a construction in which the entire power unit and transmitting mechanism is mounted yieldingly within the hull in a manner such that all vibrations and pulsations of the motor or those due to irregularities in the drive, are effectively cushioned from the hull or members which carry these driving elements.

The present invention relates to that portion of the above structure which has to do with the mounting of the propeller shaft within the hull by means of a bearing which is secured to the hull through yielding, and non-metallic cushioning elements, whereby vibrations and irregularities in the transmission of power will be isolated from the hull and the deleterious effects therefrom greatly diminished.

Further and other objects of the invention will appear as the description proceeds and reference will now be had to the accompanying drawing, wherein:

Figure 1 is a plan view, partly in section, showing a preferred form of the propeller shaft bearing according to the present invention.

Figure 2 is a view in section taken on line 2—2 of Figure 1 and looking in the direction of the arrows.

Referring to the drawing, a propeller shaft $a$, mounted upon rib $a'$ of the vessel is carried upon such rib by a bearing casting $b$ having a housing $b'$ and oppositely extending arms $b^2$ which are formed with opposed seats $b^3$ and $b^4$ at the ends thereof. The bearing housing $b'$ may be provided with suitable packing $b^5$ which engages a sleeve $a^2$ secured to the propeller shaft $a$. A ball race $a^3$ is carried by the sleeve $a^2$ and is secured in place by lock nut $a^4$.

The bearing housing $b'$ carries a second ball race $b^6$ which cooperates with the ball race $a^3$ and is secured in position by a second lock nut $b^7$. Packing $b^8$ serves to retain the lubricant within the bearing since the associated structure is formed to prevent its escape save through the packings $b^5$ and $b^8$.

The ends of the arms $b^2$ are secured in yielding non-metallic cushioning elements $c$. Suitable housings $d$ are secured to the rib $a'$ and caps $d'$ are adapted to confine the blocks $c$ under compression when they have been placed in position. The degree of compression under which blocks $c$ are carried, may be varied by means of the bolts $d^2$ at either side of the caps $d'$ and the entire housing and cap is shown as secured to the rib $a'$ by means of bolts $d^3$. As will be seen from Figure 2, the blocks $c$ are formed with recesses which are adapted to receive the ends of the arms $b^2$ carrying the seats $b^3$ and $b^4$.

It will be seen from the foregoing description that the above mounting for the bearing of this propeller shaft is of a yielding character and although the vibrations are cushioned, the mounting is sufficiently positive to prevent excess movement of the shaft under the stresses which create the vibrations. This quality is obtained by maintaining the cushioning elements under considerable pressure, for in such condition, the vibrations are effectively deadened without permitting appreciable movement of the shaft with respect to the mounting.

I claim as my invention:

In combination with a propeller shaft for a boat, a self-aligning bearing mounting the shaft, a mounting for the bearing comprising a cage, a removable side for securing the bearing therein, diametrically opposed rigid arms integral with the cage and diverging therefrom, housings supported in the hull into which the arms extend, respectively, and yielding non-metallic material within said housings, surrounding said arms and secured in fixed relation thereto under predetermined compression.

This specification signed this 22d day of December, A. D. 1927.

ALFRED F. MASURY.